Figure 2:
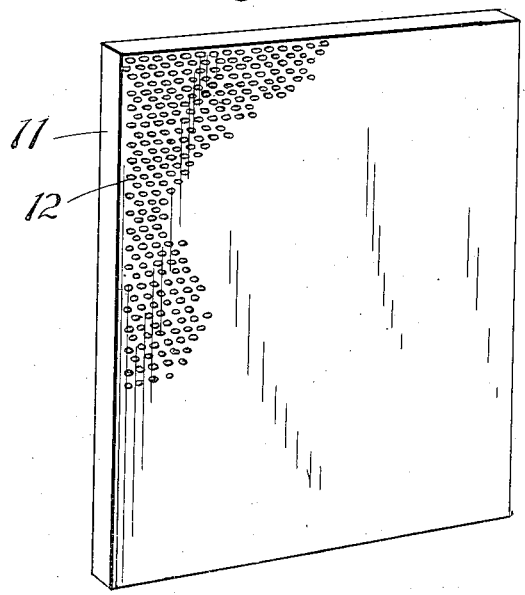

T. A. WILLARD.
METHOD OF MAKING STORAGE BATTERY SEPARATORS.
APPLICATION FILED AUG. 7, 1916.

1,243,372.

Patented Oct. 16, 1917.

Inventor
Theodore A. Willard
by Thurston & Kwis
Attys

UNITED STATES PATENT OFFICE.

THEODORE A. WILLARD, OF CLEVELAND, OHIO.

METHOD OF MAKING STORAGE-BATTERY SEPARATORS.

1,243,372.

Specification of Letters Patent. Patented Oct. 16, 1917.

Application filed August 7, 1916. Serial No. 113,424.

*To all whom it may concern:*

Be it known that I, THEODORE A. WILLARD, a citizen of the United States, residing at Cleveland, in the county of Cuyahoga and State of Ohio, have invented a certain new and useful Improvement in Methods of Making Storage-Battery Separators, of which the following is a full, clear, and exact description.

This invention relates to a method of forming storage battery separators and particularly to a method of increasing the porosity of separators containing porosity producing fibers, threads or strands such as disclosed in my prior applications, Serial No. 848,296, filed June 30, 1914, and Serial No. 5588, filed February 1, 1915.

In the applications referred to, I have disclosed and claimed a novel form of separator which is made by building up a block or body consisting of porous material such as cloth, or threads, fibers or strands woven or unwoven, held together by rubber or other suitable cementitious material, and slicing the block or body into sections in such a manner that the threads, strands or fibers extend through the separator blank or section from one side thereof to the other, these pore producing elements being very closely associated and being substantially uniformly distributed throughout the blank.

As described in said application, the block or body, from which the blanks or sections are cut, may be formed in different ways and from a variety of materials, but in any event the composite body is required to be subjected to great pressure to form a solid mass containing no holes, openings or pores other than the pores produced by the fibrous material of which the body is chiefly composed. The pressure is required also for the purpose of vulcanization, it being desired that the body or mass be at least partially or semi-vulcanized before it is sliced into the sections.

The separators produced from these sections or blanks have proven to be very efficient inasmuch as they are far more durable and have considerably greater life than the common wood separators, and their porosity while comparing favorably with the porosity of wood separators, has been slightly less than the latter.

I have discovered that the porosity of the separators of the type briefly explained above, can be very materially increased by treating the blanks or sections so as to expand or cause them to expand and hence to restore to substantially their normal shape the fibers which are compressed and flattened by the heavy pressure to which the block or body is subjected before it is cut into the sections.

This treatment of the blanks or sections, which is preferably done before the completion of the separators into their final form, constitutes the subject matter of the present invention which may be briefly summarized as consisting in the novel step or combination of steps of the method which will be described in the specification and set forth in the appended claims.

Figure 1:
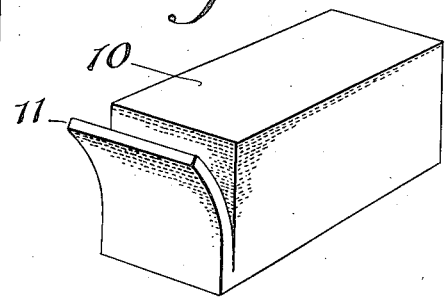
Figure 3:
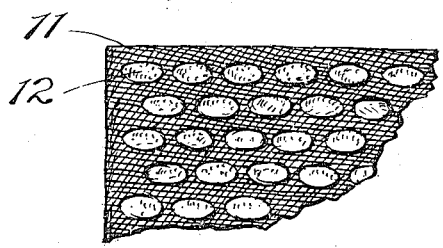
Figure 4:
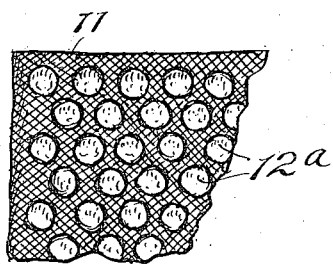
Figure 5:
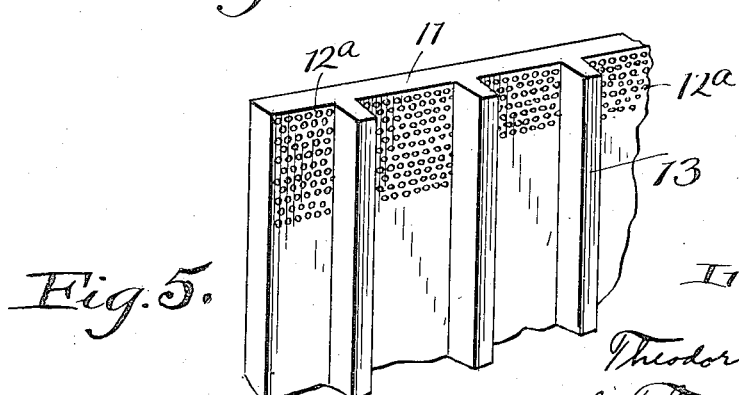

The method, or so much thereof as is necessary for an understanding of the present invention is disclosed on the accompanying sheet of drawings, wherein Figure 1 is a perspective view of a block or body from which the separator sections are adapted to be sliced; Fig. 2 is an enlarged view of one of the separator blanks after it has been sliced from the block and before the expanding treatment; Figs. 3 and 4 are fragmentary views showing on a very much enlarged scale the approximate shape of the fibers or strands before and after the expanding treatment; and Fig. 5 is a perspective view of a portion of one form of a completed separator made in accordance with my invention.

The separator blanks are cut or sliced from a block or body 10, which is a composite body formed from the pore producing material and cementitious material as explained more fully in my prior applications before referred to. The pore producing material, as explained in said applications, may consist of numerous materials such as cloth, fibers, threads, strands or other finally divided material which when incorporated in the body will produce very minute pores. The cementitious material is preferably rubber which may be applied by coating or impregnating the porous material, which is preferably arranged in layers, or it may be incorporated in the body by arranging the pore producing and the cementitious material in alternate layers. Regardless of the manner, and of the materials of which the body is made, the latter is subjected to a very great pressure usually during vulcanization, the pressure being applied at right angles to the pore producing materials.

The effect of this pressure is to flatten, and hence to decrease the porosity of the threads or fibers, as is illustrated in Figs. 2 and 3, wherein 11 represents one of the separator blanks or sections after it has been cut from the body, and 12 represents the ends of the threads or fibers or other pore producing material which extend through the section. In these two figures the pore producing elements are shown as elongated in cross section or somewhat flattened out of their normal substantially circular shape.

For the purpose of increasing the porosity of the separators and also of enlarging the sections or blanks, the latter are expanded, causing the threads or fibers to substantially assume their normal shape as shown in Fig. 3, where the strands, threads or fibers are shown at 12ª as substantially circular. The expanding of the sections may be accomplished in numerous ways, such as by pressure applied to the faces of the sections, or to a somewhat lesser degree by immersing or soaking the sections in a suitable solution which may contain a rubber solvent such as benzol which will soften the rubber, or by the action of heat to which the sections may be subjected to the proper extent. If the blanks are expanded by pressure, this is preferably accomplished by passing the blanks between revolving rolls.

After the sections or blanks are expanded as above explained, thus increasing their porosity and enlarging them, they are generally subjected to a further hardening process such as by further vulcanization which causes the rubber to become hard and completely cured, and the sections or blanks are usually provided with uneven surfaces such as are formed by corrugations or ribs. In Fig. 5 I have shown a portion of a finished ribbed separator provided on one side with ribs 13, it being understood, of course, that the separator might be provided on both sides with the ribs, and that the uneven surfaces might be formed in other ways. It is quite desirable, however, that the expanding be done before the ribs are applied, for otherwise the ribs would prevent, or at least very materially limit the expanding action. Ribs may be applied to the separate sections by laying rib forming material such as uncured rubber in strip form on one or both sides of the sections and then vulcanizing the same thereto.

In this manner the porosity of the separators is considerably increased without in any way affecting the usefulness or efficiency of the separators in other respects, and at the same time there is a very considerable saving of material over that which would be required to produce, without the expanding treatment, separators of the same size as those which have been expanded in accordance with the present invention. In other words, by expanding the separator blanks or sections I may employ smaller blanks, or less material, and expand them to the desired size.

Having thus described my invention, what I claim is:

1. The method of increasing the porosity of a separator blank containing transverse porous material which comprises expanding the blank.

2. The method of producing storage battery separators which comprises cutting into sections a mass or body of porous separator material and subsequently enlarging or expanding the sections.

3. The method of producing storage battery separators which comprises cutting into sections a mass or body containing porous material and changing the cross sectional shape of the porous material to increase its porosity.

4. The method of forming storage battery separators which comprises slicing or cutting into sections a block or body composed of porous material and cementitious material and expanding the sections.

5. The method of forming storage battery separators which comprises cutting or slicing into sections a compressed body of stranded or fibrous material and binding material and increasing the cross sectional area of the individual strands or fibers to increase the porosity of the same.

6. The method of forming storage battery separators which comprises cutting or slicing into sections a compressed block or body built up of porous material and non-porous binding material, and restoring to their substantially normal shape the threads or strands which were distorted by compression.

7. The method of producing storage battery separators which comprises slicing into sections a body containing pore producing material, expanding the sections and subsequently applying ribs thereto.

8. The method of producing storage battery separators which comprises slicing into sections a body formed by firmly compressing a number of layers of pore producing material with a suitable binding material, treating the sections by expanding them so as to increase their size and cause the porosity of the individual threads, strands or fibers to be increased, and after such treatment applying ribs to the sections.

In testimony whereof, I hereunto affix my signature.

THEODORE A. WILLARD.